Patented Dec. 4, 1934

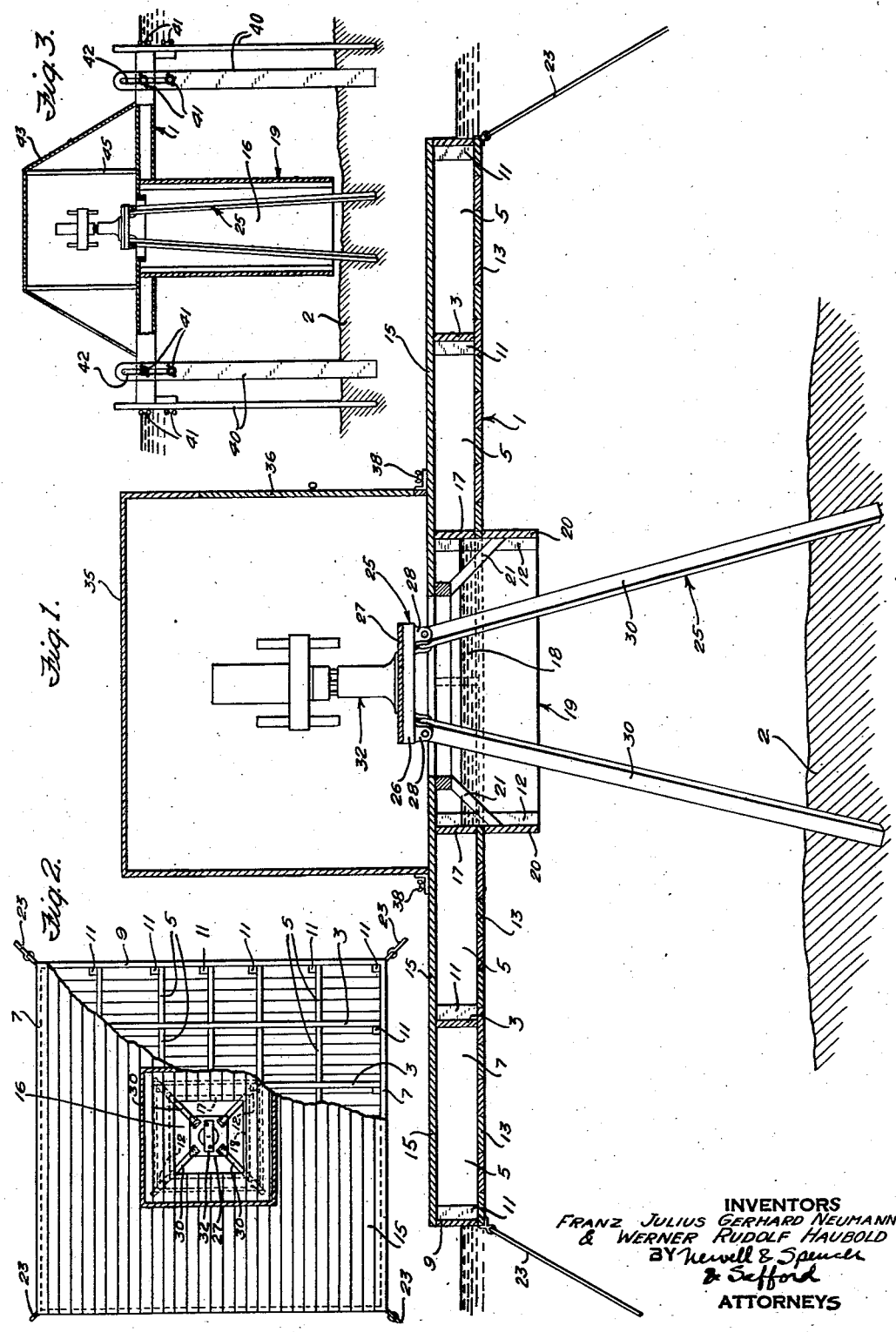

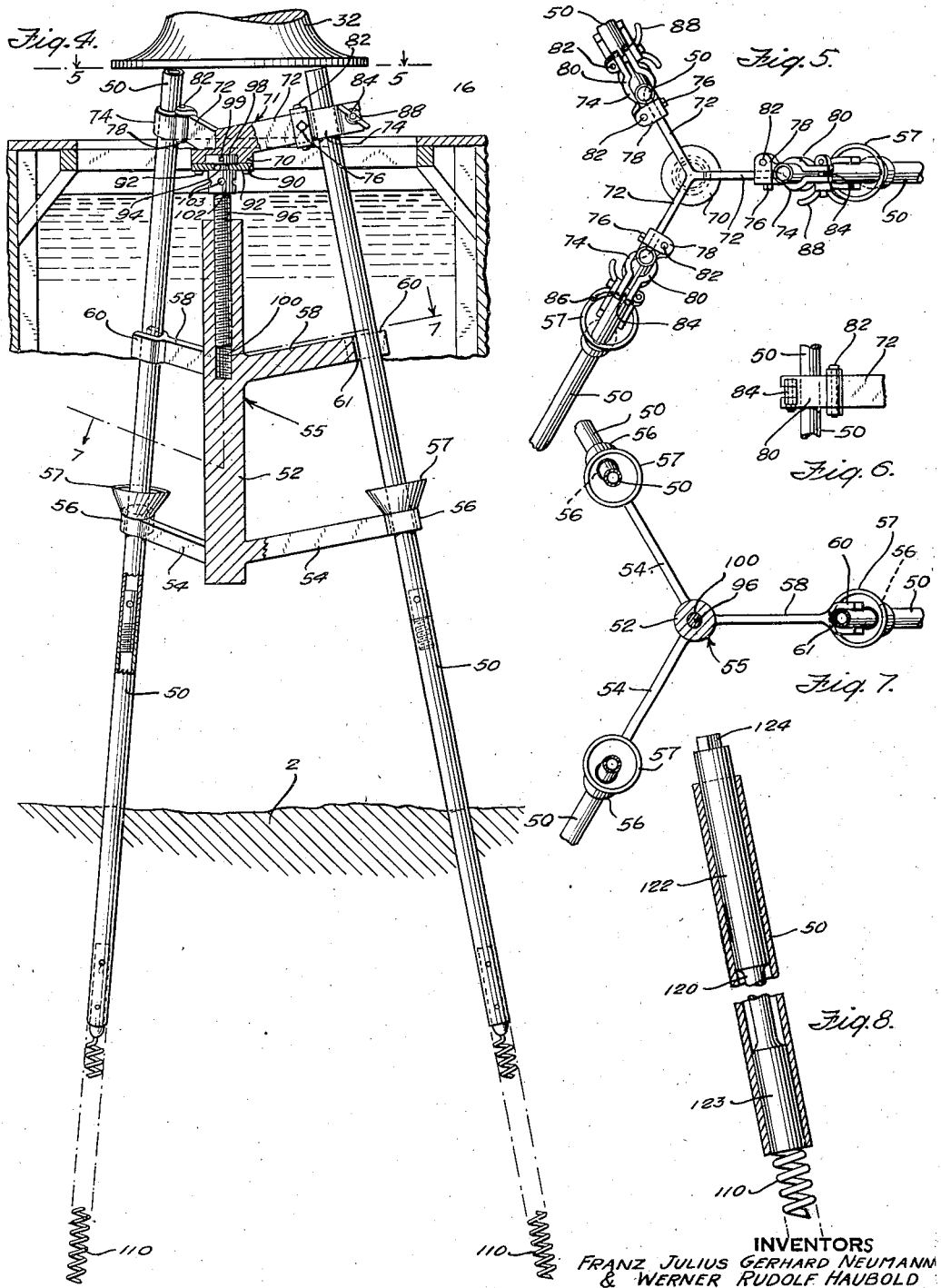

1,983,483

UNITED STATES PATENT OFFICE 1,983,483

APPARATUS FOR MAKING GEOPHYSICAL MEASUREMENTS

Franz Julius Gerhard Neumann and Werner Rudolf Haubold, Anahuac, Tex., assignors by mesne assignments, to The Salt Dome Oil Corporation, Houston, Tex., a corporation of Delaware Application March 3, 1934, Serial No. 713,852

15 Claims. (Cl. 265—1)

This invention relates to apparatus for making geophysical measurements. The invention more particularly relates to apparatus for making such measurements upon the areas of the earth's surface which are covered by water.

The methods of making geophysical measurements on land where the portion of the earth's surface upon which the geophysical instrument being used is readily accessible, are well known and understood. Such measurements have been made based on differences in the density or of the mass of the different materials, rocks, strata or other deposits in the earth's structure. Also measurements have been based on electric conductivity, magnetic qualities, radio emanations and also upon the capacity of the structure to shock.

The torsion balance is an instrument in common use for determinations based on differences in mass. The seismograph is used to determine the rate of transmission of shock by materials of different character in the earth. For this purpose vibrations artifically produced are used. In most cases the instruments used in making these measurements must be positioned in fixed relation to the earth's structure or at least firmly or stably positioned with respect thereto. Particularly with instruments of the type of the torsion balance and the seismograph in which the parts are delicately mounted, it is necessary that the instrument be so firmly or stably supported and held with respect to the earth's surface that accidental movement thereof shall be prevented. It also is necessary that the instrument be protected from the influence of outside forces causing jar or vibration which would produce error in the reading or prevent accurate observations being made. In the use of such instruments on land it has been possible to take such precautions without difficulty.

The use of geophysical instruments and the making of geophysical measurements upon areas of the earth's surface covered by water heretofore have been attended with such difficulty as to have prevented extensive making of measurements of this kind in such areas. We are aware that heretofore it has been proposed to mount a geophysical instrument on a pile driven into a penetrable bottom underlying a body of water. We are also aware of the method which has been proposed for mounting geophysical instruments in a submersible vessel so constructed and used as to firmly or stably position the instrument with respect to the earth underlying the body of water. With the aid of such a submersible vessel it has been possible to make such measurements in depths in which it would be impractical to drive piles.

In relatively shallow depths of water in which the use of a submersible vessel is impractical or unnecessarily expensive, it has been found that geophysical instruments mounted on piles are subjected to serious errors due to forces acting upon the instrument which are the result of the motion of the water caused by currents or by the wind as well as to the wind itself. A pile or a group of piles upon which a geophysical instrument may be supported is subject to the wave action which may produce forces of such amount as to cause vibration or jar of the instrument which will entirely prevent readings of sufficient accuracy to be of scientific or commercial value. Moreover, when such supports or piles are positioned in currents of water, forces of like character may act upon the piles and may be transmitted to the instrument with equally deleterious effect. The effect of wind frequently is more severe as it blows across open water and the errors of observation and recording of the instrument may be produced in greater degree from this cause than is usual upon land; also it is more difficult to protect the instrument from the force of the wind by suitable housing unless an expensive structure and one not easily portable is erected upon the piles. Furthermore, a pile is unwieldy and heavy and difficult both to fasten in the underlying bottom, and after obtaining reading, to remove therefrom and to transport to a new position.

The present invention has for an object the provision of apparatus for making geophysical measurements upon areas of the earth's surfaces covered by water which are, therefore, not readily accessible for positioning the instrument with respect to the earth in the usual manner.

It also is an object of the invention so to carry out the methods of making these observations and to provide such apparatus as will prevent the entrance of substantial or undesirable error in the observations or readings or recordings of the instruments.

It is a further object of our invention to provide apparatus for carrying out these methods of making geophysical measurements which will be readily portable upon the surface of the water and which, without difficulty, may be positioned with respect to the earth's surface at the point where it is desired to make the measurements. Moreover, it is an object of the invention that the apparatus shall be so constructed as to shield the instrument from shock or disturbance produced by the motion of the water or of the air.

It is a further object of our invention to provide a readily demountable support for the geophysical instrument so that it may be positioned with respect to the earth fixedly and firmly and so that it may cooperate with the means for shielding the instrument from the action of the water or of the air tending to cause disturbance and error.

The invention comprises means which may be utilized with supports such as piles driven into the bottom underlying the body of water for the support of the geophysical instrument and a transportable platform upon which the observer or operator may work in setting the support and in mounting the instrument thereon, as well as in making the observations. This platform, however, is so constructed as to shield the support for the geophysical instrument from the action of the water and from the action of the waves or of the wind causing the waves. According to our invention, preferably, we provide a float so constructed as to provide the working platform above the surface of the water and of such construction that it may be readily towed or otherwise transported from one location of making observations to another. Such a float may be of such mass and of such form as to take the impact of the water current or of the wave action and to prevent the forces of said current or wave action reaching either the support for the instrument or the instrument itself.

In the embodiment of our invention hereafter described in connection with the drawings, we have provided in such a float or platform an opening providing a space extending downwardly toward the bottom underlying the body of water, through which space the support for the geophysical instrument may be passed and positioned with its lower end fixed in the earth bottom and with its upper end extending above the water level formed within the space or opening. Upon such a support the geophysical instrument may be easily mounted by the observer or workman without interference by the water current or by the wave action, a quiet mass of the water having a quiet surface thereby being secured within the opening. Moreover, by suitably extending the walls of the opening downwardly toward the bottom, not only the upper portion of the support and the geophysical instrument itself may be shielded but the water action may be prevented from reaching the major portion of the support.

The invention therefore contemplates in combination with a support contacting with the earth bottom and of a form to position the geophysical instrument mounted thereon at or above the water level of the body of water covering the area of the earth's surface being surveyed, a shield for preventing action of the water and waves reaching the support and the instrument. The invention further contemplates a portable float so constructed as to provide for shielding of the instrument and its support and so constructed that the support may be placed in position fixedly with respect to the earth bottom while being shielded by the float and so that the geophysical instrument may be readily mounted on the support.

The invention further contemplates a particular construction of the support for the geophysical instrument which may be readily inserted fixedly in place with respect to the earth underlying the body of water, may be readily demounted or collapsed and transported to a new location, and may be positioned and mounted from the platform provided by the float without the necessity of apparatus such as a pile driver. Moreover, the support of our invention is of such construction that the desired rigidity for support of the geophysical instrument and the firm contact with the underlying surface of the earth is secured. The construction of the support of our invention is also such that a considerable amount of accidental shock and jar or other disturbance due to external forces may reach the support without causing displacement or disturbance thereof, or disturbance of the instrument itself such as will introduce undesirable error. The invention will be more clearly understood from the following description taken in connection with the drawings in which Figure 1 shows a vertical cross-section through the float providing a platform and a shield surrounding a geophysical instrument mounted on a support set in the opening of the float.

Figure 2 shows a horizontal cross-section on line 2—2 of Figure 1.

Figure 3 shows a modified construction of the shield of the invention.

Figure 4 shows the vertical section of a support for a geophysical instrument.

Figure 5 shows a plan view at lines 5—5 of Figure 4.

Figure 6 shows a detail of the construction of the support of Figure 4.

Figure 7 shows a section on line 7—7 of Figure 4.

Figure 8 shows a modified form of the leg of the support of Figure 4.

In Figures 1 and 2 is shown a float so constructed and framed as to provide a rigid construction capable of floating upon the surface of the water covering a portion of the earth's surface on which geophysical measurements are to be made. Preferably the float is so constructed as to provide a working platform at a distance above the water level such that the workmen and operators may be above the water level and so that the action of the waves will not cover the platform with water. Moreover, the float is of such size that the wave action is broken at the edges of the float and preferably sufficient area of the float is also provided to permit the workmen and operators to move about on the float in preparing for and carrying out their observations. Preferably, however, the float is constructed of wood because the specific gravity of wood is only slightly less than unity and thus is not markedly different from the specific gravity of the water. In this way no substantial exterior influence of mass or of gravitational forces is introduced as may be the case with a float constructed of iron, for example. By suitably distributing the mass of the iron or other material, however, a float of such other material may be used.

The form of float illustrated in Figures 1 and 2 is merely one embodiment of the invention and may be constructed with wood beams or framing members 3 extending across the float from one side to the other, as shown in Figure 2 where the deck boarding has been removed to disclose the framing. In between these beams or framing members 3 are fitted cross-beams 5 extending at right angles to the beams 3 and forming therewith a rigid frame. At the ends of the beams 3 and transversely thereto, forming two sides of the platform, are cross-beams 7. Beams 9 form the other two sides of the float.

In order to tie the framing members together and to stiffen the structure, particularly at the surfaces of the float which form contact with the water, posts 11 may be inserted which may be nailed, bolted or otherwise securely fastened to the two members such as beams 3 and cross-beams 7 or beams 9 and cross-beam 5. Upon the lower side of the frame are applied planks 13 extending parallel to the beams 3, and upon the upper side of the float and forming the platform floor are planks 15 laid transversely to the beams 3. The joints between the several planks 15 and the joints between the beams 9 and cross-beams 7, as well as the joints between these members and the planks 13 may be caulked in the manner which is usual in constructing a floating vessel. The deck 15 also may be made water tight. The construction above described is merely typical and any suitable construction may be adopted which will provide a floating member capable of carrying the working load when floating and having the proper stability, as well as the proper distribution of the mass thereof.

In a practical embodiment of the invention we have used a depth of float of about 1½ feet and the size of float about 30 feet on each side. At the center of the float in the particular embodiment illustrated in Figures 1 and 2 is constructed an opening therethrough providing a downwardly extending space 16 into which the water rises to the same level as that outside the float. The dimensions of this space 16 in a practical embodiment may be, for example, 10 feet on each side. The space 16 may be formed by the members 17 and 18 which are suitably framed with the beams 3 and the cross-beams 5 or may be formed by these beams themselves. In order to stiffen the structure the posts 12 are provided in the corners which may extend below the underside of the float to provide support for a skirt or shield 19 constructed of planks 20 fastened to posts 12. The skirt 19 may extend downwardly from the float to any desired distance and as shown in the modification illustrated in Figure 3 may extend close to the bottom underlying the body of water.

Within the space 16 in the arrangement shown in Figures 1 and 2 is positioned a support 25 having a table constructed with a suitable frame 26 and a top 27 provided with clevis pieces 28 to which are pivotally fastened legs 30. In the particular embodiment illustrated in Figures 1 and 2 the support is provided with four legs, but such a support may be constructed in other ways and conveniently as a tripod, a particular form of which is to be hereafter described as part of our invention.

The top 27 of the support 25 provides a surface upon which may be rested the base 32 of a geophysical instrument. The particular instrument illustrated is a torsion balance having the usual devices for leveling and adjustment, which in themselves form no part of the present invention. The table 27 provides a surface or a bearing which may be so formed that any instrument which it may be desired to use may be set thereon.

For more ready access to the instrument itself, while leaving ample space around the legs 30 of the support 25, the deck or floor 15 is extended over the space 16 and supported on brackets 21. The construction of the opening 16 and of the platform surrounding the support for the instrument should be such as to provide clearance between the support 25, or between the instrument itself, and any portion of the float or platform. Particularly in that form of the float which is arranged to be anchored to the bottom, as shown in Figure 1, by cables 23 it is necessary that the size of the opening 16 and the amount of clearance shall be such that the movement of the float caused by water currents or action of wind and wave on the float will not bring the float into contact with the support 25 or the instrument 32. The opening, however, should be so restricted that from the platform around the opening the workman may set the support 25 on the bottom underlying the water, may suitably adjust it in operating position and may set thereon and adjust the geophysical instrument being used.

In Figure 1 is shown also a housing 35 having an access door 36. Said housing may be fastened by suitable fasteners 38 upon the deck or floor 15 of the float 1. This housing not only serves as a protection for the instrument from the weather and from spray but shields the instrument from the force of the wind which might cause disturbance thereof. By thus shielding the instrument error in the observations and registrations of the instrument is reduced or prevented. This housing also serves to keep the temperature of the instrument more nearly constant.

The modification shown in Figure 3 illustrates a platform capable of floating and of being transported upon the surface of the water similar to the construction of Figure 1. Instead of anchoring the float by means of cables 23 as in Figure 1 struts or supports 40 may be used and may be fastened by fasteners 41 to the structure of the float at the sides or edges thereof. These struts may be driven into the bottom underlying the water to a point where the upper ends thereof become suitably positioned for engagement with the side of the float and then may be fastened thereto in a convenient manner. By providing a slot 42 in the upper end of the strut through which the fastening means may pass we may adjust the strut for different depths of water while being able to drive the lower end of the strut into the bottom sufficiently to provide not only the support for the platform but to securely hold it in position when fastened to the struts.

As above referred to, the skirt 19 in the embodiment of the invention shown in Figure 3 may extend to a point near the bottom or to any desired depth. This skirt encloses a space 16 within which the support 25 may be positioned with the legs thereof driven or pressed into the bottom underlying the water in the manner described in connection with Figure 1. Thus the support 25, by means of the structure of the float 21 and the skirt 19, is shielded not only from the action of the waves at the surface of the water and any forces transmitted through the water due to the wave action, but is shielded from the action of currents of or in the body of water itself. Moreover, in the structure illustrated in Figure 3 the platform, being positioned to the struts 40 is prevented from pitching and rolling under wave action and a stable platform may be secured upon which a shelter 43 may be erected which may be in the form of a tent with sloping sides supported by a suitable frame 45. By sloping the sides as shown, the action of the wind upon the structure and upon the float is thereby decreased.

While in some cases the construction illustrated in Figure 3 may be preferable, the construction illustrated in Figure 1 in most cases prevents the action of the waves from reaching the support 25 and the instrument 32 and provides a quiet surface and a quiet mass of water within the opening 16. Moreover, the size and mass of the float may be such that while it may be easily transported or towed from place to place, nevertheless it may have such mass and such extent upon the surface of the water as to reduce the pitch or roll of the float to the degree where even with considerable force and height of the waves a substantially quiet water mass is maintained within the opening 16 of the float. Moreover, by suitably constructing the skirt 19, the surge of wave action or the vibration caused by currents flowing by the legs 30 of the support 25 may be reduced or eliminated.

It will be apparent from the above description of our invention that the apparatus and construction herein disclosed particularly are adapted for use in making geophysical measurements on areas of the earth's surface which are covered with water to a depth such that from the surface of the water the bottom may be reached by structures or struts which are convenient to handle and which may have their lower ends forced into the earth so as to fix the strut with respect to the earth while extending up through the water to a point adjacent the surface so that the geophysical instrument may be supported thereon.

While the invention is not limited to particular depths of water and while the provision of a shield against wave action and against water currents as well as against wind for a geophysical instrument mounted upon a support set in the water may be utilized within practical limits regardless of the depth of the water, in general we consider that our invention has particular application in depths of water from about 2 to 20 feet. Bodies of water having a depth of 2 feet or greater and particularly when exposed in open extents to the force of the wind, may develop considerable wave action and it becomes necessary to shield the instrument against the force of such waves. Moreover, in order to secure readings over a sufficiently large area the apparatus must be transportable. We therefore have devised the float, above described, constructed to provide the shield for the instrument and for its support. In depths of water, however, extending to say 20 or 30 feet it is still possible to reach the bottom with struts to hold the platform or support for the instrument which may be driven into or otherwise fixed in the bottom by working from the floating platform, provided that these struts and supports are suitably constructed.

In order to provide a support which may be used in any depth of water in which it is possible to reach the bottom with a member in the form of a strut, we have devised a frame or structure which may be assembled in place in the space 16 or in some cases may be inserted therein after assembly. The depth of the water in which the support is to be set and the question of convenience may determine which method is to be adopted. We have provided in this support, however, for fixing the lower ends of the strut members thereof in the earth bottom underlying the body of water and for securing a high degree of rigidity of the structure of the support, so as to further reduce the possibility of disturbance of the instrument by exterior forces. Moreover, the construction of the support is such that it may easily be assembled without the use of particular apparatus and the strut members thereof may be fastened into the earth bottom with the use of hand tools only.

In Figure 4 is shown a vertical section through the support of our invention. The legs 50, of which three are utilized in the particular embodiment illustrated in Figures 3, 4, 5, 6 and 7, may be made of pipes. In this particular embodiment these pipes may be of about 2" nominal pipe size, having an outside diameter of about 2⅜". As will be understood from further description of the device, the legs 50 are driven into or otherwise fixedly positioned in the earth bottom 2 underlying the body of water and are inclined to each other and converge upwardly toward each other. As may be seen from Figures 5 and 7 they are spaced apart, symmetrically in the particular arrangement illustrated, around a common axis.

In a vertical position generally coincident with said axis is provided a shaft or elongated hub 52 from which project two sets of arms spaced apart along said shaft or hub and in each set an arm extends generally laterally from the axis toward each of the three pipes. Adjacent the lower end of the shaft 52 the arms 54 project in an upwardly inclined direction to connect said shaft with three collars 56 provided with funnel like portion 57. These collars have holes therethrough somewhat larger than the outside diameter of the pipes 50. The arms 54 hold these collars 56 in such position that the axis of the holes therethrough has the same general inclination in which it is intended that the pipes of the tripod shall become positioned when fixed in the earth bottom and held in proper position to support the base of the geophysical instrument 32.

The upper set of arms 58 are similarly rigidly connected to the shaft or elongated hub 52 and extend in a slightly upwardly inclined direction to jaws or clevis pieces 60. These clevis pieces 60, which may be open at the outside portions thereof as shown in Figures 4, form guides through which the pipes may be slid when inserting them in position, as will be hereafter described. The arms 54 and 58 and the shaft or hub 52 form a rigid frame 55 which it will be clear from a consideration of the drawings and the above description, may be held by the three pipes extending through the collars 56, the outermost portion of the inner surface of the hole of the collar bearing against the outermost surfaces of the respective pipes 50, the clevises 60 sliding along the pipes until further movement is arrested by the collars 56 resting against the pipes. On the other hand, the frame may be lifted in a direction of the axis of the shaft 52 until the collars are substantially clear of the pipes 50. If held in such position by some means, as hereafter described, the pipes 50 may be slid lengthwise thereof through the open space of the clevises 60 and through the openings in the collars 56.

In Figure 4 at 70 is shown a hub having connected thereto, to form a rigid frame or spider 71, arms 72 extending outwardly from the hub 70 to engage the pipes 50. In the embodiment of our invention illustrated in Figures 4 and 5 these arms 72 are formed adjacent their outer ends with portions 74 extending part way around the pipes 50. Also rigidly fastened to the arms 70 by suitable fastening means 76 are hinge bearings 78 having hinge pieces 80 pivoted therein upon hinge pins 82. The hinge pieces 80 may, therefore be swung away from the pipes 50 or may be swung against the pipes 50 in a generally parallel position to the portion 74 of the arms 72. The hinge pieces 80 have pivoted adjacent their outer ends swing bolts 84 upon which may be screwed wing nuts 86. In the portion 74 of the arms 72 which contact the pipes 50, a slot 88 is provided in which the swing bolt 84 may be slipped when the hinge piece 80 is to be clamped around the pipes 50 and the wing nuts 86 may then be screwed up to bind the pipes 50 between the portions 74 of the arms 72 and said hinge pieces 80.

The hub 70 is provided with a flange 90 fastened by means of bolts or other fasteners 92 to the hub 70. The hub 70 is so formed as to provide a recess behind the flange 90 when the flange 90 is fastened thereto, the flange 90 having a hole therethrough through which may pass the shank 94 of a jackscrew 96. Fastened by means of a pin 99 to the shank 94 of the jackscrew 96 is a collar 98 fitting within the recess of the hub 70. The shank 94 and the collar 98 fastened thereon are free to turn in this recess with the turning motion of the jackscrew 96 upon its axis. Thus it will be seen that the jackscrew is held in operable relation with the frame or spider 71 provided by the hub 70 and the arm 72 so as to receive the thrust of the jackscrew in an upward direction while holding the jackscrew from dropping out of engagement with the spider. In the shaft or hub 52 is cut a thread 100 fitting to the thread of the jackscrew 96. Also fastened upon the shank 94 of the jackscrew or forming an integral part thereof is a collar 102 having holes 103 therein to receive a wrench bar for the purpose of turning the jackscrew on its axis.

It will be clear from a consideration of Figure 4 that when the jackscrew 96 is screwed out of the thread 100 in the shaft 52 the collar or flange 98 will be moved upwardly against the inner wall of the recess in the hub 70 and the hub 70 will be moved away from the frame 55 formed by the arms 54 and 58 connected to the shaft 52. On the other hand, if the spider 71 is held in a fixed position the frame 55 will be moved away from the spider 71 when the jackscrew 96 is screwed out of the thread 100. Reverse movements of the parts will be secured by opposite turning motion applied to the jackscrew 96.

If the spider 71 is clamped upon the legs 50 by the hinge pieces 80 held by the clamping force of the wing nuts 86 and swing bolts 84, then upon turning the jackscrew 96 out of the thread 100 the arms 54 will be forced downward in a direction axially of the shaft 52. The inner surface of the outer portion of the collars 56 will move into contact with the outer portions of the respective pipes and further turning motion of the jackscrew 96 will cause these collars to bear hard upon these pipes. Because of the inclination of the pipes and of the inner surfaces of the collars and because the motion applied to the collars is in a direction parallel to the axis of the shaft 52, a jamming or wedging action of the collars upon the pipes 50 will occur. As the spider formed by collars 56, the arms 54 and the shaft or hub 52 are parts of the rigid frame 55, further motion of the frame 55 is stopped upon wedging of the collars upon the pipes 50. The pipes are rigidly gripped by the spider and are held in fixed and rigid connection with each other at the portion of the length thereof contacted by the collars 56. As the upper ends of the pipe 50 are rigidly held in the spider 71 and as the shaft 52 and the jackscrew 96 form a stiff connection between the spider 71 and the frame 55 including the arms 54 and the collars 56, the whole support thus becomes a rigid unit. When the lower ends of the pipes 50 are suitably fixed in the earth bottom underlying the water, a firm and rigid support is thus provided for the geophysical instrument mounted upon the upper ends of the structure and one which will withstand the forces caused by motion of the water either due to currents or wave action and one which will withstand the shock which may be accidentally applied thereto by contact with the float by the workmen's tools or from other external sources.

In order to fixedly position the pipes in the earth bottom underlying the body of water, we may drive the pipes into penetrable material in said bottom to a depth sufficient to secure a rigid and firm support for these pipes. It is important in using some geophysical instruments, such as the seismograph, to insure that an intimate and firm contact with the earth is secured in order that the artificially generated earth shock may be properly transmitted to the instrument through the structure. In some cases in order to secure the desired firmness and contact with the earth, we have found that it is desirable to drive or otherwise force the legs or struts, especially when using pipes such as those described above, into the solid earth bottom underlying the water to a depth of 3 to 4 feet. We have so devised our support that we may drive these pipes to any desired depth and may form the pipes or legs 50 in sections as indicated in Figure 4, of such length as may be conveniently handled and, by coupling sections together, to provide sufficient length reaching into the firm earth bottom underlying the water.

In this connection, it should be explained that in many localities a firm penetrable earth bottom underlying bodies of natural water is overlaid with a layer of slit or semi-liquid mud or ooze below the water and incapable of bearing weight or of holding a structural member in fixed position in relation to the earth bottom. Thus it is necessary in many cases not only to provide a strut which is sufficiently light in weight to be handled from the float but one which must be sufficiently long to reach down through the water and through the layer of ooze and to penetrate into the earth bottom a distance sufficient to give rigid support to the strut or leg. By utilizing pipes for the struts or legs of our support we secure the desirable light weight and are able to make the legs in convenient sections which may be easily coupled together. Moreover, pipes may readily be driven into a penetrable earth floor.

We have found, however, that we may simplify the work of fixing and firmly positioning the struts or legs of the tripod or support of our invention by so constructing the legs that instead of driving them directly into the underlying earth floor they may be inserted therein by a turning motion. In order to accomplish this result we may provide at that end of each leg which is to be inserted in the earth, a screw member 110 which may be fastened to the end of the pipe 50 and may project beyond the end thereof. The screw member 110 may be formed as a helical coil. As an example of a convenient construction which may be utilized with pipes such as the 2″ pipes referred to above, we have formed the helical coil by winding a piece of steel ½″ in diameter upon an axis to form a helix having a diameter of about 2″ with a pitch of the degree of ¾″ to 1″ from one turn of the helix to an adjacent turn. There is thus formed a member similar to a corkscrew which, upon turning the pipe 50 upon its axis, will draw the pipe secured thereto downwardly into the earth as the screw member 110 is screwed into the earth. In order to effect this turning motion we find it merely necessary to turn the pipes with a Stillson wrench or with a wrench of other convenient type applied to the upper end of the pipes.

While, as stated above, we may assemble the parts illustrated in and described in connection with Figures 4 to 7 inclusive prior to setting the support upon the bottom, which method of utilizing the device of our invention may be most convenient in some cases, for the most part, in view of the necessity of securing the pipes 50 at sufficient depth in the penetrable earth bottom, and in some cases at different depths, we have found it preferable to assemble the support in position within the opening 16 of the float 1 described in connection with Figure 1. In order to secure the advantage afforded by the clevises 60 and collars 56 attached to the frame 55 to guide the pipes into the proper positions in the earth bottom, not only with respect to each other but with respect to the float, we may temporarily support the spider 71 upon a plank or bar set across the opening 16 so that it may be held in approximate working position in relation to the float. The arms 54 and 58 will thereby be held in fixed relation to the float, the shaft 52 being suspended by the jackscrew 96 supported by the collar 98 bearing against the flange 90 of the hub 70. By so temporarily supporting the spider 71, the hinge pieces 80 may be swung upon the hinge pins 82 away from their clamping position. The pipes 50 then may be passed down through the respective clevis pieces 60 and through the respective collars 56, the funnel-like portions 57 serving to guide the pipes 50 into the collars 56 and the collars 56 and the clevis pieces 60 acting as guides to direct the end of the pipe 50 and the screw member 110 attached thereto to the proper point at the earth bottom which is in line with the collars 50, the clevises 60 and the clamping devices 74 and 80 of the spider 71.

If the helical screw member 110 is not used, the pipes may be driven directly into the earth bottom by force supplied to the upper end of the pipes. Moreover, as the pipe is driven down into the earth additional sections may be added at the upper end of the pipe, it only being necessary that the coupling members be of such form as will pass down through the clevis pieces 60 and the collars 56. When, however, the screw member 110 is utilized, the pipe may be turned in the collar 56 and in the clevis 60 and thereby screwed into the earth bottom to the desired degree, further sections being added to the pipe if necessary. Combinations of driving the pipe and screwing it into the earth bottom may be used in certain cases depending upon the character of the structure of the bottom into which the pipes are to be driven.

When the pipes have penetrated to sufficient depth to give a firm and rigid support to these pipes and to position the upper ends thereof adjacent the water level, and preferably above the water level, the spider 71 may be clamped to the upper ends of these pipes by swinging the hinge members 80 into clamping position and fastening them by means of the wing nuts 86. The temporary support for the spider 71 may then be removed, the weight of the frame 55 being thereafter suspended upon the jackscrew 96. If, now, the jackscrew 96 is turned in a direction which will screw it out of the thread 100 in the shaft 52, as above described, the collars 56 will move downwardly in the direction of the shaft 52 and will bind upon the inclined pipes 50. The force thus applied will tend to draw pipes 50 inwardly toward the axis of the shaft 52 until they bear against the inner surface 61 of the clevis pieces 60 on the arms 58, the upper ends of the pipes and the ends fixed in the earth respectively being held in fixed relation to each other. It thus will be clear that by using the downward motion of the spider arms 54 and collars 56 it is not necessary to provide collars for the arms 58, as no bearing outwardly from the axis upon clevis pieces 60 occurs. Thus the pipes may be easily slipped into the clevis pieces.

If for any reason, however, the reverse motion of the screw 96 is preferable, collars may be used in place of the clevis pieces 60 and the upward movement of the collars 56 will tend to move the portions of the pipe passing therethrough outwardly from the center axis of the support and cause the portions of the pipe adjacent the arms 58 to move outwardly and bear against the collars which, in that case, would surround the pipes 50 and be attached to the arms 58. In either case it will be understood that the rigidity provided by the central shaft or hub 52 and its arms 54 and 58 is transferred to the otherwise free portions of the lengths of the pipes 50 between the upper ends thereof and the earth bottom.

By suitably proportioning the arms 54 and 58 of the frame 55 in relation to the shaft or hub 52, the "push" and "pull" forces, as well as the bending forces which are applied to the members of the frame 55 and the spider are withstood. In the particular embodiment of the invention with which pipes of the size of about 2″ pipe size are utilized, the shaft or hub 52 may be of about 4″ diameter and about 5 feet long. The arms 54, as shown, may be fastened adjacent the lower end of the shaft 52. Adjacent the center of the length of the shaft 52 the arms 58 are fastened. When the structure of the frame 55, for example, is built of iron the arms 54 and 58 may be welded to the shaft 52 and may be formed of flat iron bars of about 3″ to 3½″ depth by ⅝″ to 1″ thickness. The jackscrew may be of about 1½″ diameter and cut with six threads per inch and of a form which is usual in jackscrew design. The arms 72 of the spider 71 may be of material of similar size to the arms 58 and may be welded to the hub 70 and to each other at the point of joining the hub to form a rigid spider.

A modified form of the legs 50 of our support is shown in Figure 8. As will be seen from this figure, within the pipe 50 is inserted a shaft or rod 120 having a bearing 122 at the upper end thereof and provided with a bearing 123 at the lower end thereof. In some cases, a shaft 120 of uniform diameter from one end to the other thereof may be passed through the pipe. At the lower end of the shaft may be fastened the screw member 110. The pipes 50, therefore, may be clamped rigidly to the spider 71 and the shaft 120 may be turned, as with a wrench applied to the head 124 at the upper end thereof, to screw the screw member 110 into the earth bottom thus to draw the shaft down through the pipe 50. It will be understood that the pipes 50 may be driven part way into the earth bottom or all the way, the screw member being screwed into the earth bottom to secure the additional hold after driving the pipes. On the other hand, the shaft 120 may project beyond the pipes 50 and these pipes may reach, for example, down to the earth bottom and provide a guide for the shaft extending beyond the ends of the pipes into the earth to the desired depth. In any case the shaft 120 is so mechanically fitted to pipe 50 as to hold said pipe rigidly and firmly in position when the lower end of the shaft is fixed to the bottom.

Modifications of the construction of the support of our invention may be made within the scope of the invention. As suggested above, the design may be such as to provide for movement of the frame 55 in either direction with respect to the spider 71 which is clamped to the legs, in order to effect the binding or jamming of the legs to transmit thereto the rigidity of the spiders. Moreover, within the scope of our invention, by using suitable jackscrews between the parts, the fixed or clamping spider may be intermediate between the other two binding or jamming spiders. Conceivably also, in certain cases, the second spider, such as that provided by the arms 58 and the clevis pieces 60, may be eliminated and the jamming or binding of the pipes may be effected by motion of a spider such as that provided by the arms 54 and the collars 56 which is movable away from or toward the clamping spider 71. In such case, however, the pipes 50 should be of such size with respect to the free length thereof as to act with the jamming or wedging spider to produce a rigid support, as in such case the forces transmitted to the pipes by the arms 54 may act merely against the bending resistance of the pipes.

What is claimed as new is:

1. Apparatus for making geophysical measurements upon areas of the earth's surface covered by water which comprises a support of a form capable of being fixed to the earth bottom underlying the water and to extend to such a height above the bottom as to position above the water level a geophysical instrument mounted on said support, and a shield surrounding said instrument so constructed and so positioned with respect to said instrument as substantially to intercept motion of the water and to prevent disturbance due to motion of the water from reaching said instrument.

2. Apparatus according to claim 1 in which said shield is extending downwardly into the water sufficiently to prevent disturbance being transmitted through said support to said instrument.

3. Apparatus for making geophysical measurements upon areas of the earth's surface covered by water which comprises a support of a form capable of being fixed to the bottom underlying the water and extending to a point above the level of the water, a geophysical instrument mounted on said support above the water level, and a member held against substantial movement with respect to the earth and constructed so to surround said geophysical instrument as to shield said instrument from forces caused by motion of the water.

4. Apparatus for making geophysical measurements upon areas of the earth's surface covered by water which comprises a support of a form capable of being fixed to the bottom underlying the water and extending to a point above the level of the water, a geophysical instrument mounted on said support above the water level, and a member floating upon the surface of the water and anchored to prevent substantial motion thereof over the surface of the water, said floating member being constructed to surround but to float clear of said instrument when so anchored and being constructed to shield said instrument from forces caused by motion of the water.

5. Apparatus for making geophysical measurements upon areas of the earth's surface covered by water which comprises a float providing a working platform, said float having a centrally located opening therein surrounded by a submerged portion of the structure of the float and providing a clear space in the direction toward the bottom underlying the water, a support extending downwardly into the water through said space and clear of the structure of the float and having its lower end fixed in the bottom, said float being constructed with sufficient mass to absorb when anchored the impact of waves and the motion of the water to prevent the force thereof reaching said support, said support being constructed to bear the weight of and hold in operating position a geophysical instrument.

6. A platform for use in making geophysical measurements upon areas of the earth's surface, said platform being constructed to float upon the surface of the water and to bear the weight of observers and instruments when floating, said platform having an opening therein of such size as to provide a clear space extending downwardly through which from the platform a support of sufficient length to reach the earth bottom underlying the water may be fixed in said bottom with the upper end accessible from the platform around said opening but free from contact with the platform, said platform being of such mass and of such form as to shield from the impact of forces caused by motion of the water said support and a geophysical instrument mounted thereon.

7. Apparatus for making geophysical measurements upon areas of the earth's surface covered by water subject to motion with respect to the earth which comprises a support of a form capable of being fixed to the earth bottom underlying the water and arranged to support a geophysical instrument mounted thereon, and a shield positioned with respect to said instrument in the direction from which the water is moving.

8. Apparatus for making geophysical measurements upon areas of the earth's surface covered by water which comprises a support of a form capable of being fixed to the earth bottom underlying the water and arranged to support a geophysical instrument mounted thereon, and a shield so constructed and so positioned with respect to said support as substantially to intercept motion of the water and to prevent disturbance due to motion of the water from reaching said support.

9. Apparatus for making geophysical measurements upon areas of the earth's surface covered by water which comprises a support of a form capable of being fixed to the earth bottom underlying the water and arranged to support a geophysical instrument mounted thereon, and a member free of connection to said support so as to be incapable of transmitting thereto forces due to motion of the water received by said member and providing a shield so constructed and so positioned with respect to said support as substantially to intercept motion of the water and to prevent disturbance due to motion of the water from reaching said support.

10. Apparatus for making geophysical measurements upon areas of the earth's surface covered by water which comprises a support of a form capable of being fixed to the bottom underlying the water and extending to a point above the level of the water, a geophysical instrument mounted on said support above the water level, and a member floating upon the surface of the water and anchored to prevent substantial motion thereof over the surface of the water, said floating member being so constructed and so positioned with respect to said instrument as substantially to intercept motion of the water but to float clear of said instrument when so anchored so as to shield said instrument from forces concomitantly occurring with motion of the water.

11. Apparatus for making geophysical measurements upon areas of the earth's surface covered by water which comprises a support of a form capable of being fixed to the earth bottom underlying the water and to support a geophysical instrument mounted thereon, a platform held against substantial movement with respect to the earth, said platform being so constructed and being so positioned with respect to said support as to provide access to said instrument while being so positioned with respect thereto as substantially to intercept motion of the water and to prevent disturbance due to said motion from reaching said instrument.

12. A platform for use in making geophysical measurements upon areas of the earth's surface covered by water, said platform being constructed so as to be supported adjacent the water surface and so as to be held against substantial movement thereof in a plane parallel to the water surface, said platform being constructed to bear the weight of observers when so supported, and being of such form that when positioned with a part thereof in a position with respect to a geophysical instrument mounted upon a support fixed in the earth bottom underlying the water such as will intercept motion of the water toward said instrument, said part provides a shield preventing disturbance due to motion of the water from reaching said instrument.

13. A platform for use in making geophysical measurements upon areas of the earth's surface covered by water, said platform being constructed so as to be supported adjacent the water surface and so as to be held against substantial movement thereof in a plane parallel to the water surface, said platform being constructed to bear the weight of observers when so supported, and being of such form that when positioned with a part thereof in a position with respect to a geophysical instrument mounted upon a support fixed in the earth bottom underlying the water such as will intercept motion of the water toward said instrument, said part provides a shield preventing disturbance due to motion of the water from reaching said instrument, said platform being provided with a barrier extending downwardly therefrom toward the bottom and arranged to shield said support.

14. Apparatus for making geophysical measurements upon areas of the earth's surface covered by water which comprises a support of a form capable of being fixed to the earth bottom underlying the water and arranged to support a geophysical instrument mounted thereon, and a shield so constructed and so positioned with respect to said support as substantially to intercept forces caused by motion of the water and by the wind to prevent disturbances due to said forces from reaching said instrument.

15. Apparatus for making geophysical measurements upon areas of the earth's surface covered by water which comprises a support of a form capable of being fixed to the earth bottom underlying the water and arranged to support a geophysical instrument mounted thereon, and a member free of such connection to said support as would cause transmission to said support of forces concomitant with motion of the water and received by said member, said member providing a shield so constructed and so positioned with respect to said support as substantially to intercept the forces caused by motion of the water and by the wind to prevent disturbances due to said forces from reaching said instrument.

FRANZ JULIUS GERHARD NEUMANN.
WERNER RUDOLF HAUBOLD.